N. S. VEDDER.

Cooking-Stoves.

No. 6,104. Reissued Oct. 27, 1874.

WITNESSES.

Benj. A. Smith

Philip M. Shuey

INVENTOR.

Nicholas S. Vedder per Fisher & Duncan

Attys.

THE GRAPHIC CO. PHOTO-LITH. 39 & 41 PARK PLACE, N.Y.

UNITED STATES PATENT OFFICE.

NICHOLAS S. VEDDER, OF TROY, NEW YORK, ASSIGNOR TO JOSEPH B. WILKINSON.

IMPROVEMENT IN COOKING-STOVES.

Specification forming part of Letters Patent No. 93,929, dated August 17, 1869; antedated July 13, 1869; reissue No. 6,104, dated October 27, 1874; application filed July 14, 1873.

*To all whom it may concern:*

Be it known that I, NICHOLAS S. VEDDER, of Troy, in the county of Rensselaer and State of New York, have invented an Improvement in Cooking-Stoves, of which the following is a specification:

My invention relates to that class of stoves that are provided with water-reservoirs, either wholly or partially incased, and in which the construction is such as to bring the products of combustion into direct contact with the walls of the reservoir; and its principal object is to produce a more equal distribution of the heat over the walls of the reservoir than has hitherto been affected, and particularly to cause the heated products of combustion to act upon the lower portion of the incased reservoir, where necessarily their action is the most efficient. It will also be observed that a flue-space is created between the bottom of the reservoir and the bottom of the casing, and that a system of draft is provided, so that the products of combustion pass into the reservoir-chamber, come in contact with the bottom as well as the sides of the reservoir, and then pass out to the exit-pipe without having passed under the oven.

The drawings show my invention as applied to an ordinary three-flue cooking-stove.

Figure 1:
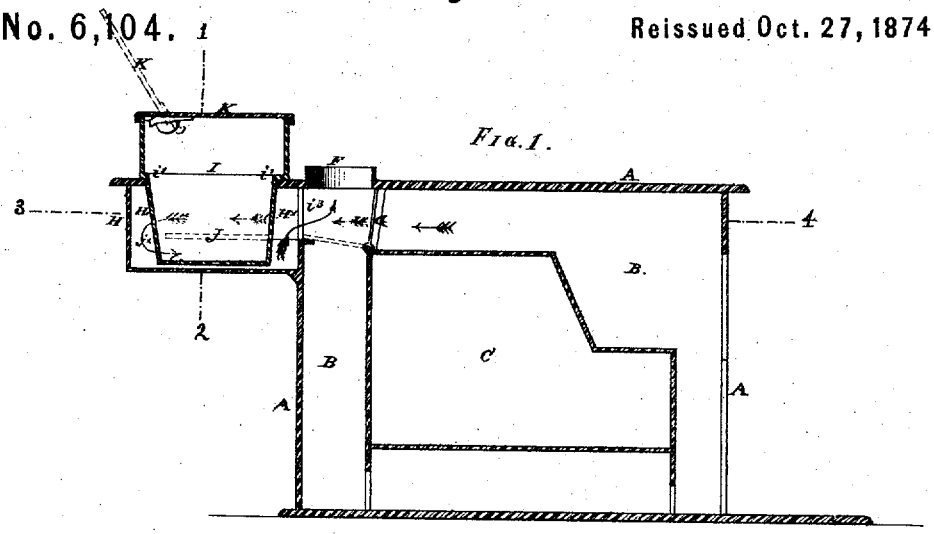
Figure 2:
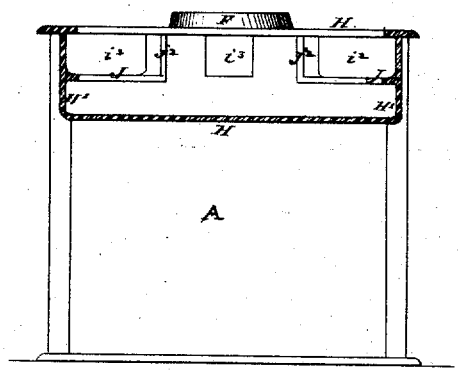
Figure 3:
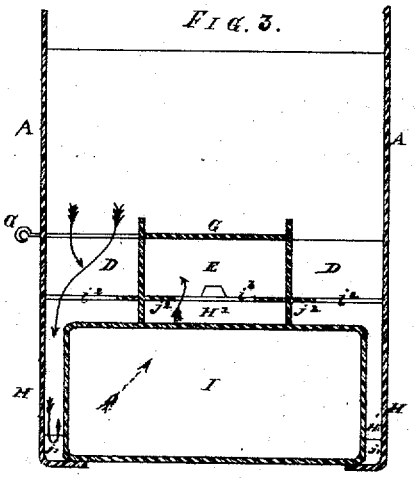
Figure 4:
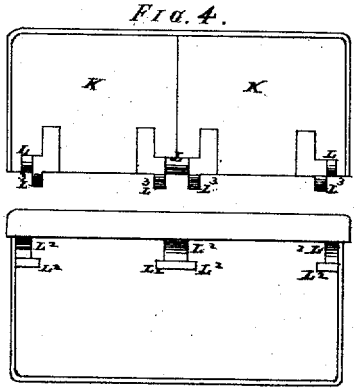

Figure 1 is a vertical longitudinal section of a cooking-stove, showing my said improvement applied thereto. Fig. 2 is a rear cross-sectional elevation upon line 1 2 of Fig. 1, the reservoir being removed. Fig. 3 is a sectional plan upon line 3 4 of Fig. 1, under a slight modification to be hereinafter described. Fig. 4 is a detail plan of reservoir, with its lid or cover detached and thrown back, so as to show the under side thereof.

Like letters refer to like parts in each of the figures.

As my invention has to do only with the reservoir attachment of the stove, the drawings do not represent in full detail the construction of the stove itself.

A is the outer case of an ordinary three-flue cooking-stove; B, the fire-chamber; C, the oven; D D, the two diving-flues passing down at the back of the oven and under the same; E, the return-flue through which the products of combustion pass on their way to the exit-pipe, after having circulated under the oven; F, the pipe-collar; G, the damper for controlling the direct passage to the exit-pipe; H, the hot-air chamber or casing which receives the water-reservoir; and I, the water-reservoir, which is heated by the hot-air admitted to and caused to circulate in the chamber H. By preference I make the reservoir of greater depth than the chamber in which it is situated, the upper part of the reservoir, which projects above the top plate of the chamber, being enlarged laterally, so as to form a shoulder, $i^1$, which bears upon the top plate, and thus supports the reservoir in position. By this construction of the reservoir I am enabled to heat a larger quantity of water than if the entire body of the reservoir were to be sunk below the top plate and within the casing or chamber. That portion of the reservoir embraced within the hot-air chamber, is sufficiently contracted to leave a flue-space, H′, between it and the walls of the casing. This intervening space may be limited to the front sides and the two ends of the reservoir, as shown in Fig. 3, or may also extend around the rear side, as shown in Fig. 1. This space communicates with the descending flues by proper openings in the back plate of the stove, as shown at $i^2$ $i^2$, and with the return or ascending flue by the opening $i^3$. From the lower edge of the openings $i^2$ $i^2$ which connect the space H′ with the diving-flues, horizontal partition-plates J J extend rearward until they meet the front wall of the reservoir, and thence still farther rearward between the end of the reservoir and the ends of the casing, but terminating before reaching the rear wall of the casing, the spaces $j^1$ $j^1$ being left between the ends of the partition and such rear wall. Vertical partitions, also, $j^2$ $j^2$, extend between the back plate of the stove and the front plate of the reservoir at points between the openings $i^2$ $i^2$ and the opening $i^3$. These vertical partitions connect the horizontal partitions, before spoken of, with the top plate of the stove. When the damper G is turned into a horizontal position, as shown by the dotted lines in Fig. 1, a direct passage is opened from the top sheet flue of the stove to the exit-pipe, which is placed in front of the reservoir and over the central vertical flue, and thus the products of combustion pass off without materially heating either the reservoir or the oven. When the damper is in the position shown by the full lines, shutting off the direct draft, the products of combustion will be turned into the side flues, where the current will divide, a part passing down the flues and under the oven and eventually ascending through the central flue to the exit-pipe, and the other part entering the reservoir-chamber, circulating therein in contact with the reservoir, and finally escaping through the aperture $i^3$ into the ascending flue of the stove.

The products of combustion that enter the reservoir-chamber are compelled, by my system of partition-plates, to circulate therein in contact with the walls and bottom of the reservoir, substantially in the course indicated by the arrows, first impinging upon the front wall of the reservoir, then passing rearward along the upper part of the end walls, then descending below the horizontal partitions and passing forward in contact with the lower part of the end walls and with the bottom of the reservoir to the aperture $i^3$.

The objects at which my invention aims are, first, to effect a more even distribution of the heat upon the walls and bottom of the incased reservoir than has been attained by previous constructions; and, secondly, to heat the reservoir upon its vertical walls and bottom by direct draft, the products of combustion not passing under the oven.

Where, for instance, the exit-pipe has been placed behind the reservoir, the communication between the inclosing-chamber and the flues of the stove being an aperture through the back plate of the stove into the ascending flue, the main body of the current passes under the bottom of the reservoir, and up along its rear wall; or else passes around the ends, or, more probably, one of the ends, leaving the bottom comparatively unaffected.

So, also, where the hot air is admitted to the chamber from one only of the side flues, and returned into the central flue, being caused to travel around the reservoir by the interposition of a vertical flue-strip between the entrance and the exit aperture, the heat will circulate mainly around the upper part and bottom of the reservoir, and thus fail to act with the same degree of uniformity upon all parts of the vertical wall and bottom of the reservoir.

Again, if it were not for the presence of the flue-strip or division-plates in the reservoir-chamber, the products of combustion, on passing through the apertures leading out from the descending flues, would pass at once, and by the shortest course, to the aperture leading from the reservoir-chamber to the ascending flue, thus acting with full intensity upon a comparatively small portion of the reservoir, and hardly at all upon the lower parts thereof. This undesirable result is prevented by the introduction of the division-plates, which cause the products of combustion to pass at first along the walls of the reservoir, toward the back part of the chamber. Then, passing the ends of the plates, they return toward the escape-aperture, and, as a result of the longer distance they are thus compelled to travel, they are distributed with a much greater uniformity over the outer surface of the reservoir, and notably over the lower parts thereof, than if the division-plates were not used.

By bringing the products of combustion into the reservoir-chamber directly from the descending flues, before they have passed under the oven, and thus parted with a large portion of their caloric, a more marked effect can be produced upon the contents of the reservoir than if they were to be admitted from an aperture in the ascending flue.

Again, the method of heating the reservoir provided with a flue-space between the bottom of the reservoir and the bottom of the casing, as well as the space around its vertical walls, so that the caloric can come in contact with the walls and bottom of the reservoir, by leading into such reservoir-chamber the products of combustion before the same have traversed the bottom of the oven, and then returning them to the exit-passage, is an improvement over any other known method of heating evenly and quickly a water-reservoir.

By introducing the products of combustion into both ends of the reservoir-chamber simultaneously, I still further aid the even distribution of the heat over the walls of the reservoir, as I thus heat both ends alike.

The special construction of the casing shown in Fig. 3, where the larger portion of the back wall thereof is cut away, leaving only enough of the outer edges of the same to close in the space between the casing and the ends and bottom of the reservoir, is designed to effect a saving in metal, and thereby reduce the weight and the expense of the structure.

Inasmuch as the front side, the two ends, and the bottom of the reservoir are exposed to the direct action of the currents, this can be done without any serious loss of heat, the slight loss that would arise being, perhaps, more than counterbalanced by the saving of material and cost, as above indicated.

What I claim as my invention is—

1. In combination with the descending flues of a diving-flue stove, which is provided at the rear thereof with a water-reservoir, wholly or partially-incased flue or division-plates arranged relatively to the reservoir and to the apertures leading out of the descending flue, substantially as described, so as to cause the products of combustion to pass backward and forward over the exterior of the reservoir, substantially for the purpose set forth.

3. In combination with an incased water-reservoir located at the rear of a stove, the flue or division plates within the reservoir-chamber, whereby a backward and forward motion of the products of combustion (which issue directly through the back plate) is obtained in such reservoir-chamber for the purpose of more evenly heating the reservoir.

3. In a diving-flue cooking-stove, having openings directly from the descending flues through the stove back into a reservoir casing or chamber located in rear of said flues, the combination of a flue-space created between the bottom of the reservoir and the bottom of the casing with the ascending rear flue, provided with an aperture or opening through which the products of combustion are allowed to pass before entering the exit-pipe, without passing under the oven.

4. In a diving-flue cooking-stove having openings from the rear flues directly through the stove back into a reservoir casing or chamber located in rear of said flues, the combination of the said back plate, provided with apertures or openings, with a flue-space created between the bottom of the reservoir and the bottom of the casing, the products of combustion circulating through said reservoir-chamber and out to the exit-pipe without passing under the oven.

5. A water-reservoir, in combination with a casing which fits closely against the vertical rear wall of the reservoir, the central part of the back of the casing being cut away, substantially as and for the purpose set forth.

NICHOLAS S. VEDDER.

Witnesses:

H. CLAY BASCOM,

WILLIAM KING.